(12) United States Patent
Bengtzohn et al.

(10) Patent No.: US 11,259,461 B2
(45) Date of Patent: Mar. 1, 2022

(54) EQUIPMENT FRAME FOR A RIDING LAWN CARE VEHICLE

(71) Applicant: HUSQVARNA AB, Huskvarna (SE)

(72) Inventors: Johan Bengtzohn, Tenhult (SE); Mats Axelsson, Lekeryd (SE)

(73) Assignee: Husqvarna AB, Huskvarna (SE)

( * ) Notice: Subject to any disclaimer, the term of this patent is extended or adjusted under 35 U.S.C. 154(b) by 257 days.

(21) Appl. No.: 16/465,757

(22) PCT Filed: Mar. 26, 2018

(86) PCT No.: PCT/IB2018/052046
§ 371 (c)(1),
(2) Date: May 31, 2019

(87) PCT Pub. No.: WO2018/185602
PCT Pub. Date: Oct. 11, 2018

(65) Prior Publication Data
US 2020/0068801 A1    Mar. 5, 2020

Related U.S. Application Data

(60) Provisional application No. 62/481,252, filed on Apr. 4, 2017.

(51) Int. Cl.
*A01D 34/66* (2006.01)
*A01D 34/76* (2006.01)
(Continued)

(52) U.S. Cl.
CPC ......... *A01D 34/662* (2013.01); *A01D 34/003* (2013.01); *A01D 34/76* (2013.01); *A01D 2034/645* (2013.01); *A01D 2101/00* (2013.01)

(58) Field of Classification Search
CPC .... A01D 34/662; A01D 34/661; A01D 34/66; A01D 2034/645; A01D 34/76;
(Continued)

(56) References Cited

U.S. PATENT DOCUMENTS 4,563,019 A * 1/1986 Kuhn ............... A01B 59/048
172/466
4,779,406 A * 10/1988 Schroeder ........ A01D 34/662
56/15.9
(Continued)

FOREIGN PATENT DOCUMENTS

EP    2 676 534 A1    12/2013
EP    3106014 A1 * 12/2016  ............. A01D 34/76
(Continued)

OTHER PUBLICATIONS

International Search Report and Written Opinion for International Application No. PCT/IB2018/052046 dated Jun. 14, 2018.

*Primary Examiner* — Alicia Torres
*Assistant Examiner* — Madeline Ivy Runco
(74) *Attorney, Agent, or Firm* — Burr & Forman, LLP

(57) ABSTRACT

A riding lawn care vehicle may include a frame to which a mobility assembly is operably coupled, an equipment frame operably coupled to the frame forward of the mobility assembly, a steering assembly operably coupled to the mobility assembly to enable an operator seated on the riding lawn care vehicle to provide steering control of the riding lawn care vehicle, a removable cutting in deck and a belt positioning system. The cutting deck includes a rotatable blade and is configured to receive power for turning the blade from an equipment drive belt of the vehicle when the equipment drive belt is operably coupled with the cutting deck. The belt positioning system is configured to enable the equipment drive belt to be automatically operably coupled between the cutting deck and the riding lawn care vehicle in response to the cutting deck being docked with the equipment frame in an operational position.

16 Claims, 10 Drawing Sheets

(51) Int. Cl.
*A01D 34/00* (2006.01)
*A01D 34/64* (2006.01)
*A01D 101/00* (2006.01)

(58) Field of Classification Search
CPC ........ A01D 34/77; A01D 34/81; A01D 34/86; A01D 34/863; A01D 34/866; A01D 2101/00; A01D 69/00–69/12; A01B 59/064
See application file for complete search history.

(56) References Cited

U.S. PATENT DOCUMENTS

| | | | | |
|---|---|---|---|---|
| 4,901,508 A * | 2/1990 | Whatley | ............... | A01D 34/863 |
| | | | | 56/10.4 |
| 5,600,943 A * | 2/1997 | Ryan | ............... | A01D 34/661 |
| | | | | 56/13.6 |
| 5,927,055 A * | 7/1999 | Ferree | ............... | A01D 34/662 |
| | | | | 56/15.9 |
| 5,960,614 A * | 10/1999 | Jones | ............... | A01D 34/863 |
| | | | | 172/245 |
| 6,347,503 B1 * | 2/2002 | Esau | ............... | A01D 34/64 |
| | | | | 56/15.9 |
| 6,393,815 B1 * | 5/2002 | Funk | ............... | A01D 34/662 |
| | | | | 56/202 |
| 7,293,398 B2 * | 11/2007 | Koehn | ............... | A01D 34/74 |
| | | | | 56/15.9 |
| 7,347,039 B2 * | 3/2008 | Koehn | ............... | A01D 34/74 |
| | | | | 56/15.9 |
| 7,481,036 B2 * | 1/2009 | Lilliestielke | ............... | A01D 34/662 |
| | | | | 56/15.9 |
| 7,596,936 B2 * | 10/2009 | Schick | ............... | A01D 34/74 |
| | | | | 56/15.9 |
| 7,870,710 B2 * | 1/2011 | Koehn | ............... | A01D 34/662 |
| | | | | 56/15.9 |
| 8,091,329 B2 * | 1/2012 | Schick | ............... | A01D 34/74 |
| | | | | 56/15.9 |
| 2009/0182470 A1 * | 7/2009 | Garvey | ............... | A01D 34/82 |
| | | | | 701/50 |
| 2009/0182471 A1 * | 7/2009 | Bucher | ............... | A01D 34/662 |
| | | | | 701/50 |
| 2015/0271994 A1 | 10/2015 | Lee et al. | | |
| 2016/0050847 A1 * | 2/2016 | Bartel | ............... | A01D 34/64 |
| | | | | 56/15.2 |

FOREIGN PATENT DOCUMENTS

| | | | | |
|---|---|---|---|---|
| EP | 3 138 377 A1 | 3/2017 | | |
| EP | 3138377 A1 * | 3/2017 | ........... | A01D 34/662 |
| JP | 05184217 A * | 7/1993 | | |

\* cited by examiner

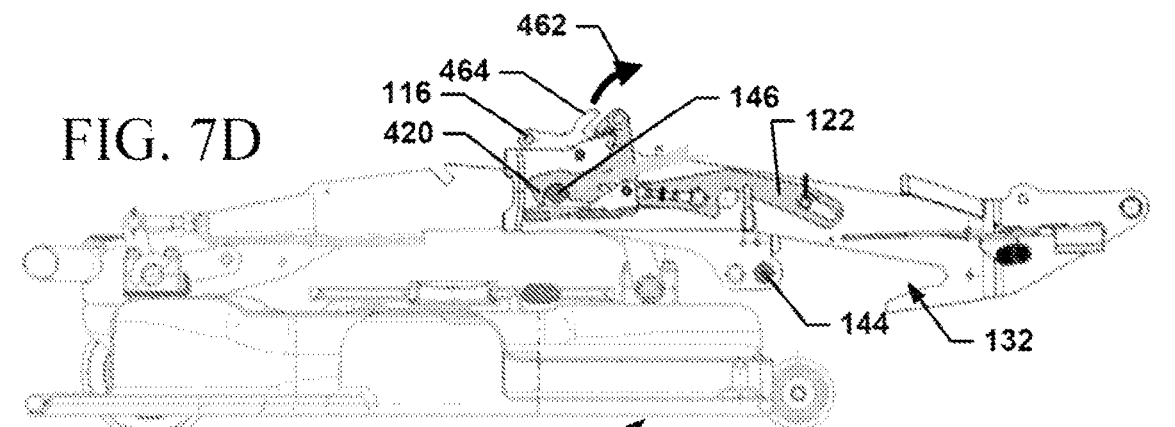
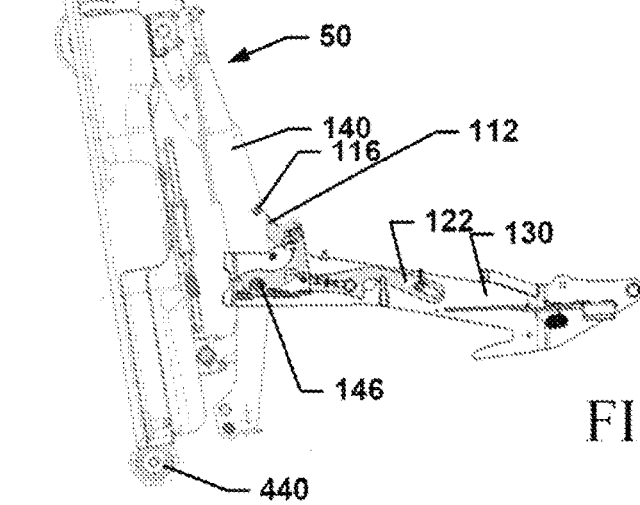

EQUIPMENT FRAME FOR A RIDING LAWN CARE VEHICLE

CROSS REFERENCE TO RELATED APPLICATIONS

This application claims priority to U.S. application No. 62/481,252 filed Apr. 4, 2017, the entire contents of which are hereby incorporated by reference in its entirety.

TECHNICAL FIELD

Example embodiments generally relate to lawn care vehicles with a front mounted cutting deck and, more particularly, relate to an equipment frame for such a lawn care vehicle.

BACKGROUND

Lawn care tasks are commonly performed using various tools and/or machines that are configured for the performance of corresponding specific tasks. Certain tasks, like grass cutting, are typically performed by lawn mowers. Lawn mowers themselves may have many different configurations to support the needs and budgets of consumers. Walk-behind lawn mowers are typically compact, have comparatively small engines and are relatively inexpensive. Meanwhile, at the other end of the spectrum, riding lawn mowers, such as lawn tractors, can be quite large. Riding lawn mowers provide the convenience of a riding vehicle as well as a typically larger cutting deck as compared to a walk-behind model. Similarly, riding lawn care vehicles typically provide users with increased convenience by enabling them to perform the yard maintenance tasks faster without exerting effort to push or walk with a vehicle. Furthermore, riding lawn care vehicles can sometimes be configured with various functional accessories (e.g., trailers, tillers, plows, snow blower attachments, lawn cutting blade attachments, bagging attachments and/or the like) to enable them to tackle numerous different tasks depending on the accessories added thereto.

As can be appreciated from the description above, riding lawn care vehicles may come in many different sizes and may have wide variances in their capabilities. However, beyond mere changes in size and function, riding lawn care vehicles can also be produced with a great deal of variation in relation to the configurations via which various ones of the functions they can perform are provided. For example, some riding yard maintenance vehicles may have attachments that are rear mounted, front mounted, or even mounted between the front and rear wheels. The many possible variations in configuration may enable designers to produce specific device configurations that are able to excel in certain difficult operating environments. However, with regard to these different possible configurations and attachments, one common concern is the ease and convenience of shifting between configurations.

BRIEF SUMMARY OF SOME EXAMPLES

Accordingly, some example embodiments may provide a structure for employment in connection with a riding lawn care vehicle to which accessories are front mounted. In this regard, some example embodiments may provide an improved equipment frame to which a front mounted cutting deck or other accessories may be mounted with relative ease and convenience. Moreover, the structure of some example embodiments may allow for a relatively straight forward process to attach or remove the cutting deck or to shift the cutting deck into a service position.

For example, in one embodiment of the invention, a riding lawn care vehicle is provided. The riding lawn care vehicle may include a vehicle frame, an engine supported at least in part by the vehicle frame, a mobility assembly operably coupled to the vehicle frame, an equipment frame operably coupled to the vehicle frame to extend forward of the mobility assembly, a steering assembly operably coupled to the mobility assembly to enable an operator positioned on the riding lawn care vehicle to provide steering control of the riding lawn care vehicle, a belt positioning system operably coupled to the vehicle frame and comprising an equipment drive belt, and a removable cutting deck including a cutting blade and configured to automatically switch from a disconnected state to a connected state in response to docking the cutting deck with the equipment frame. In the connected state, the cutting deck is operably coupled to the equipment frame such that the equipment drive belt is configured to transfer power from the engine to the cutting deck to drive the cutting blade. In the disconnected state, the equipment drive belt is not configured to transfer power from the engine to the cutting deck to drive the cutting blade.

In another example embodiment, a belt positioning system for a riding lawn care vehicle having a removable cutting deck is provided. The belt positioning system may include an equipment drive belt configured to transfer power from the riding lawn care vehicle to the cutting deck to turn at least one blade of the cutting deck and a plurality of pulleys disposed on the riding lawn care vehicle proximate to an equipment frame operably coupled to a front portion of a vehicle frame of the riding lawn care vehicle. The plurality of pulleys may be configured to position the equipment drive belt relative to a blade drive pulley of the cutting deck. The belt positioning system is configured to enable the equipment drive belt to be automatically operably coupled to the blade drive pulley in response to the cutting deck being docked with the equipment frame in an operational position.

In another example embodiment, a riding lawn care vehicle is provided. The riding lawn care vehicle may include a frame to which front wheels and rear wheels are operably coupled, an equipment frame operably coupled to the frame forward of the front wheels, a steering assembly operably coupled to at least one of the front wheels or rear wheels to enable an operator seated on the riding lawn care vehicle to provide steering control of the riding lawn care vehicle, a removable cutting deck and a latching assembly. The cutting deck includes a rotatable blade and is configured to receive power for turning the blade from an equipment drive belt of the vehicle when the equipment drive belt is operably coupled with the cutting deck. The latching assembly is configured to be operable to alternately enable engagement between the equipment frame and the cutting deck in an operational position or a service position, and enable disengagement of the cutting deck from the equipment frame.

Some example embodiments may improve an operator's ability to employ a front mounted model of a lawn care vehicle to accomplish various yard maintenance activities. The user experience associated with changing configurations and conducting cleaning or maintenance on the riding lawn care vehicle may also be improved.

BRIEF DESCRIPTION OF THE SEVERAL VIEWS OF THE DRAWING(S)

Having thus described the invention in general terms, reference will now be made to the accompanying drawings, which are not necessarily drawn to scale, and wherein:

Figure 1:
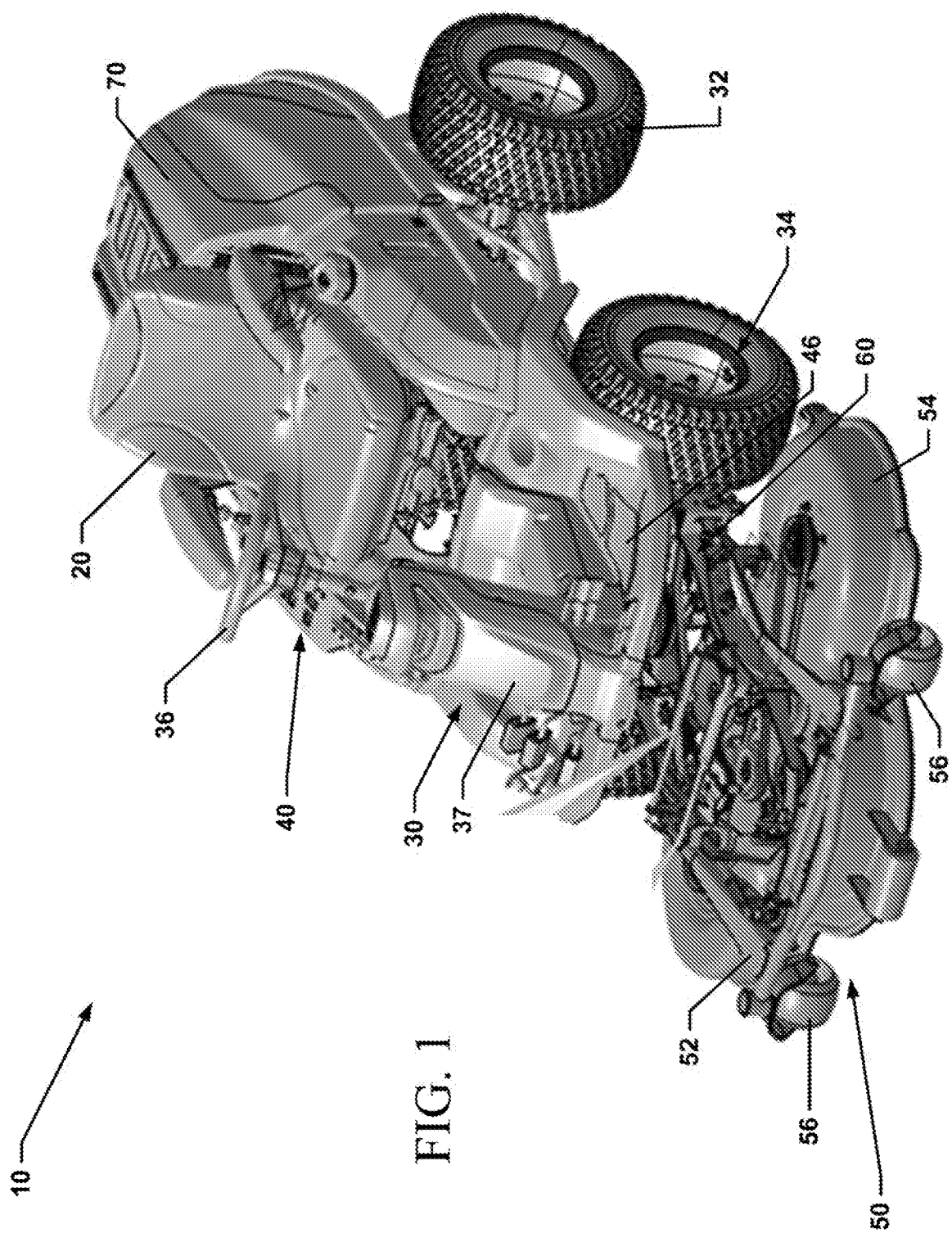
FIG. 1 illustrates a perspective view of a front mount riding lawn care vehicle according to an example embodiment.
Figure 2:
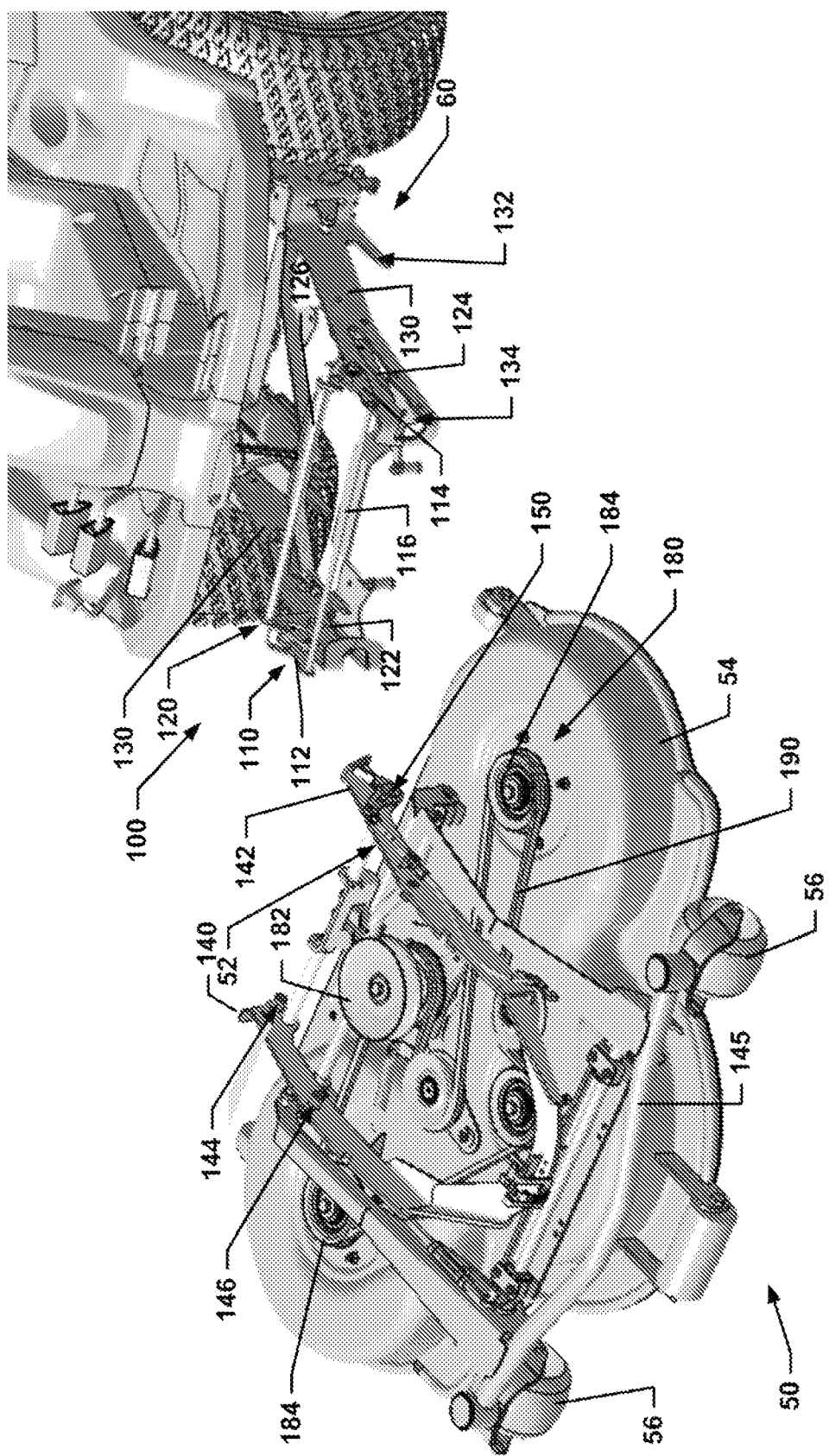
FIG. 2 illustrates a perspective view of the riding lawn care vehicle of FIG. 1 with a cutting deck removed according to an example embodiment.
Figure 3A:
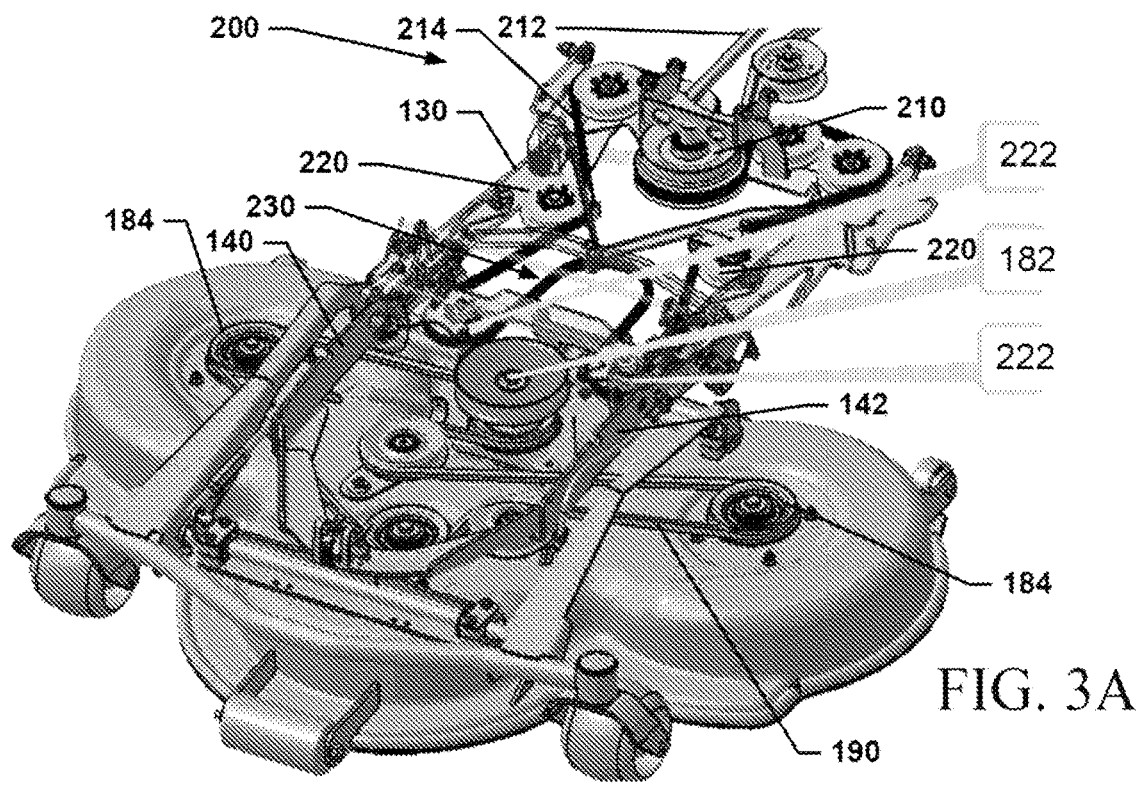
Figure 3B:
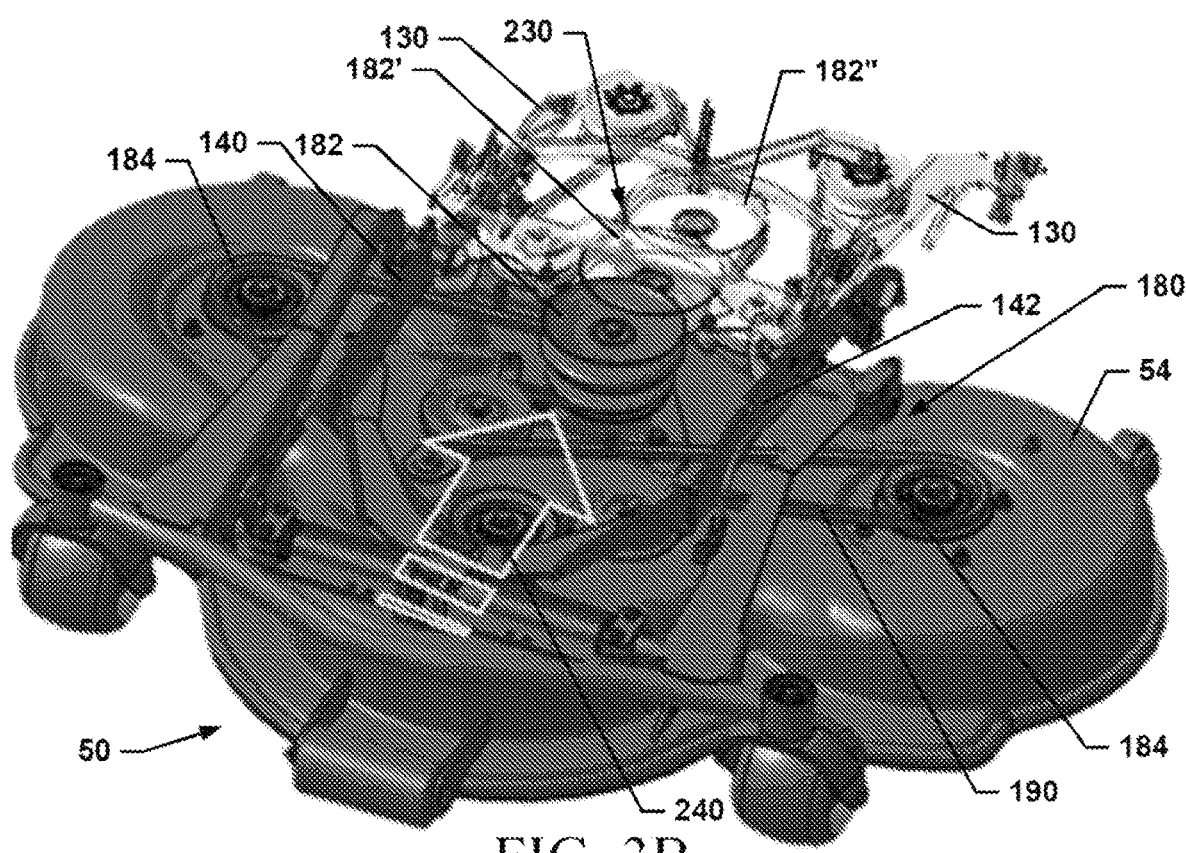
Figure 3C:
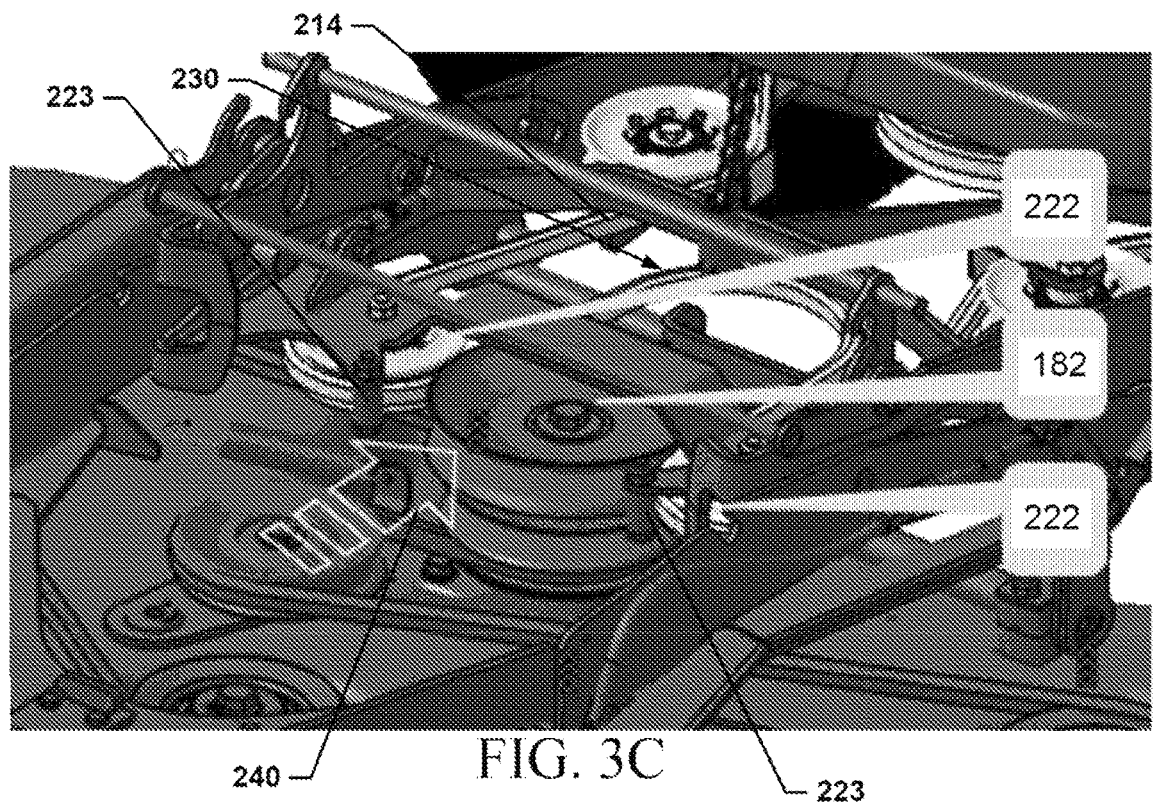
Figure 4:
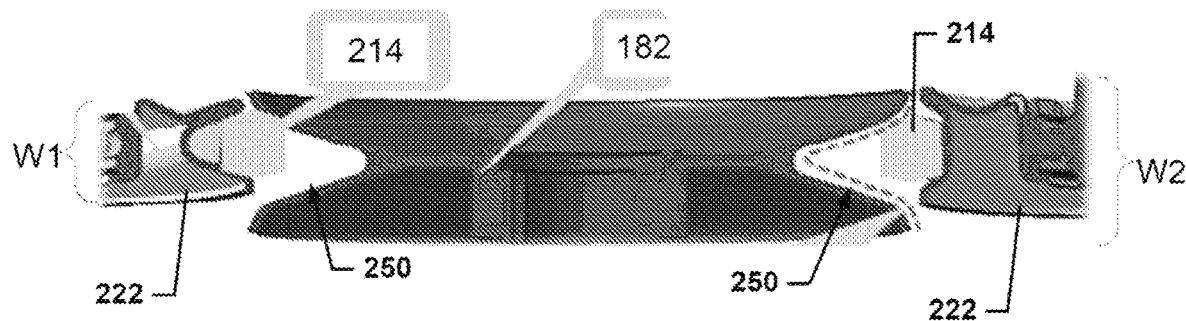
Figure 5:
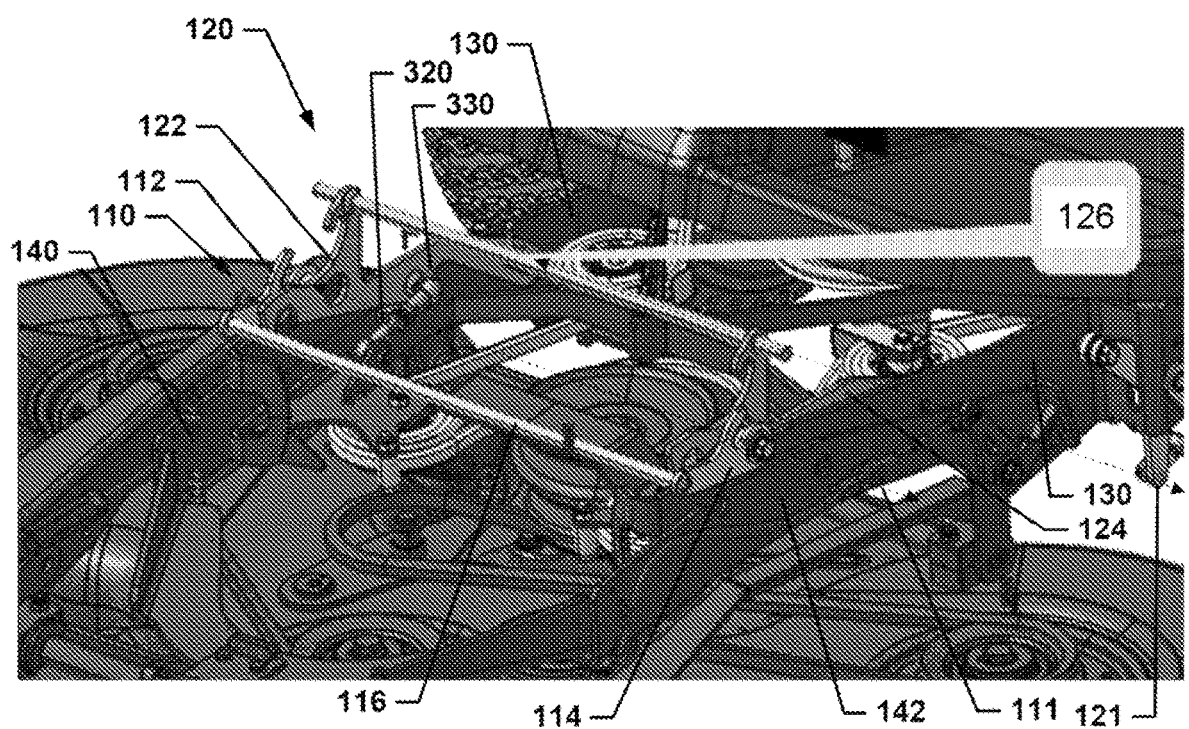
Figure 6A:
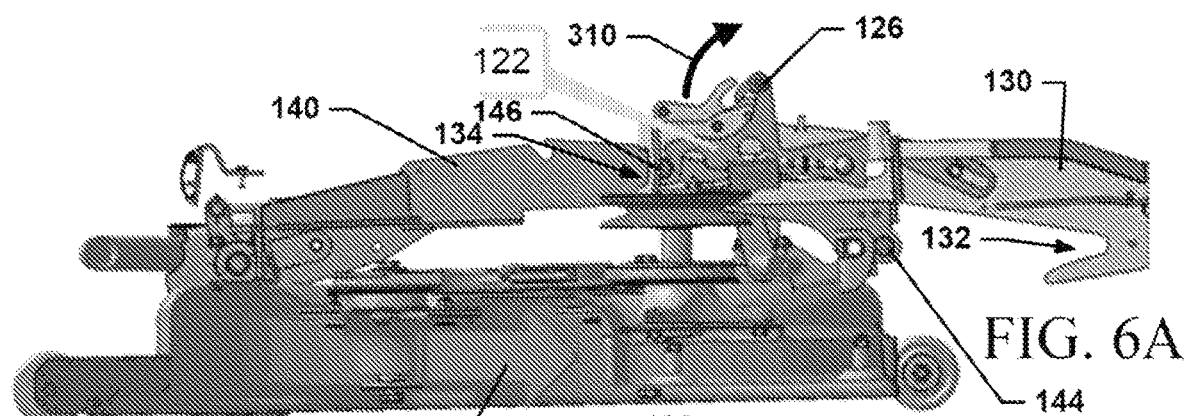
Figure 6B:
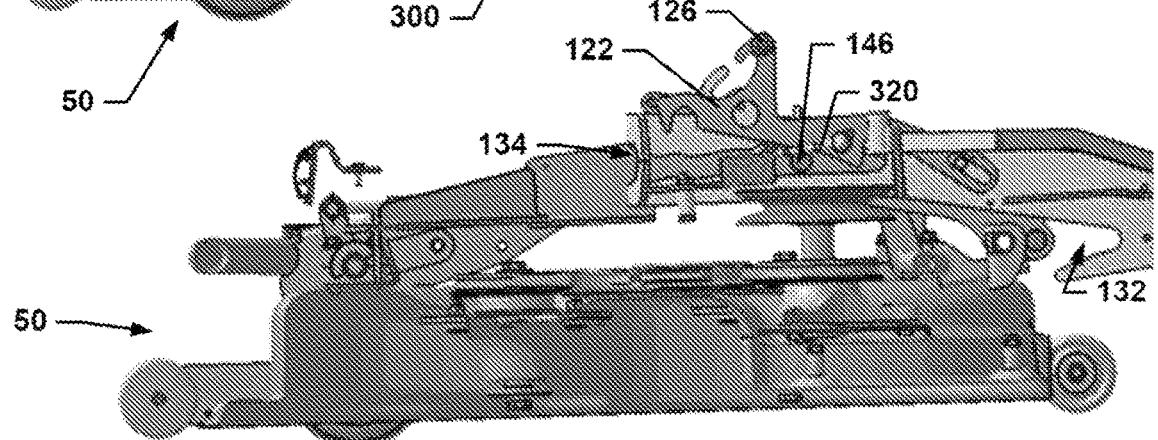
Figure 6C:
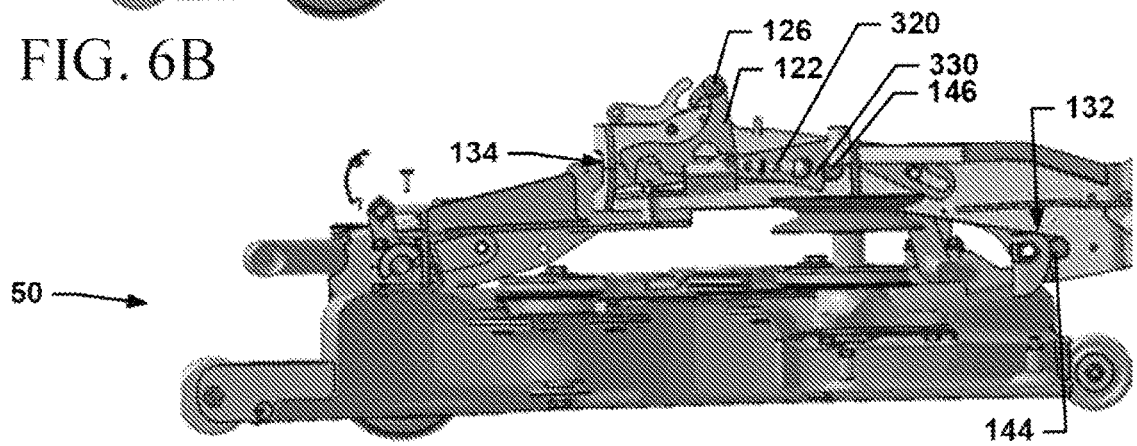
Figure 7A:
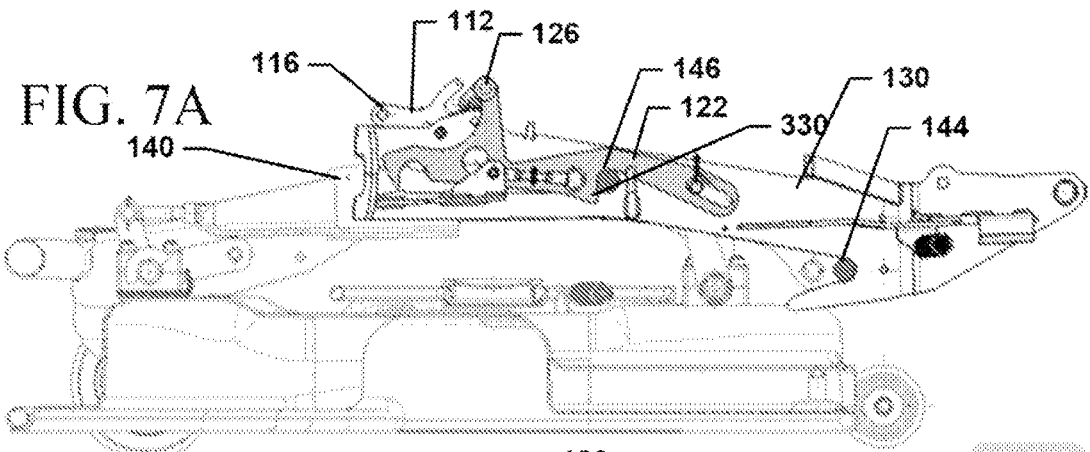
Figure 7B:
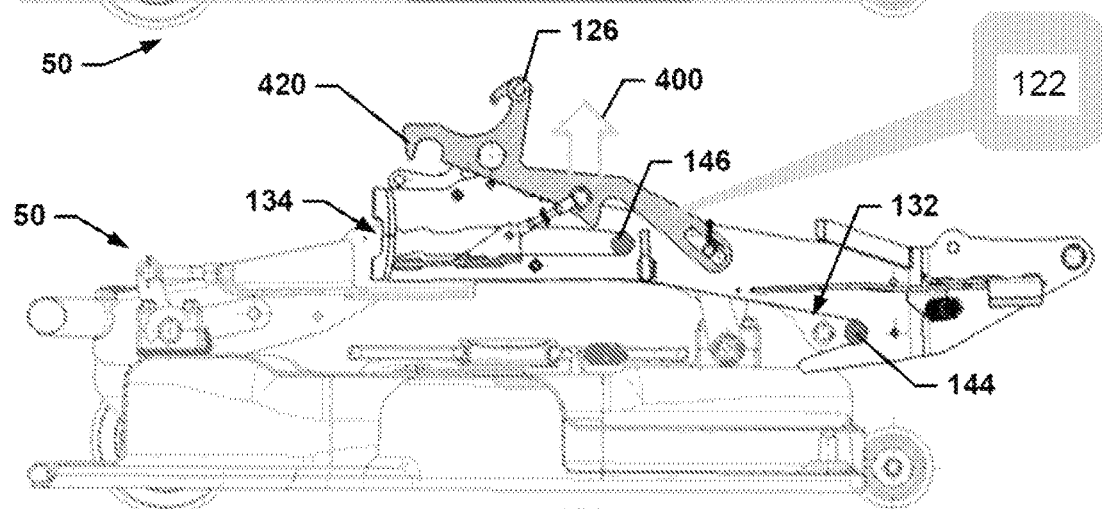
Figure 7C:
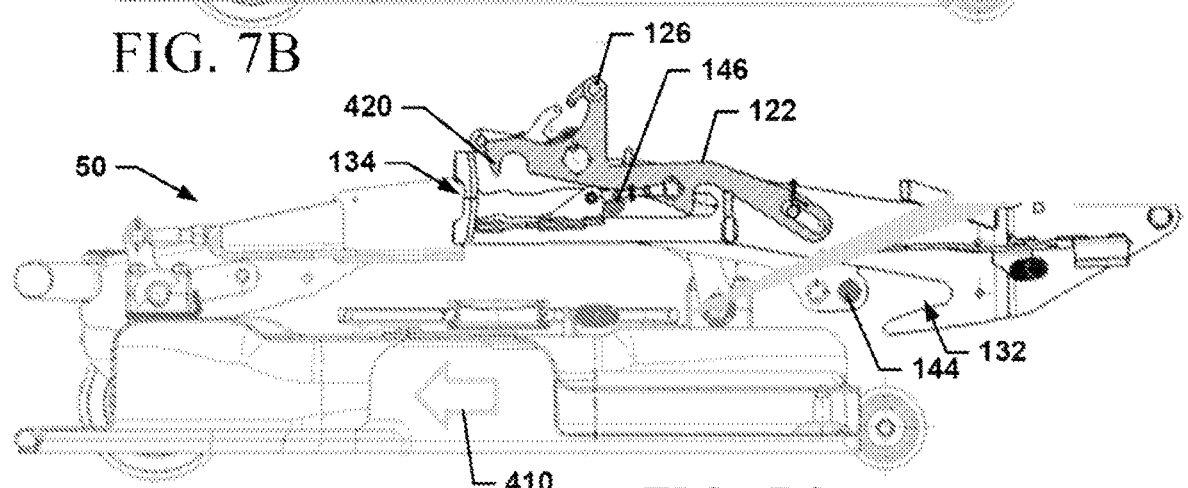
Figure 8:
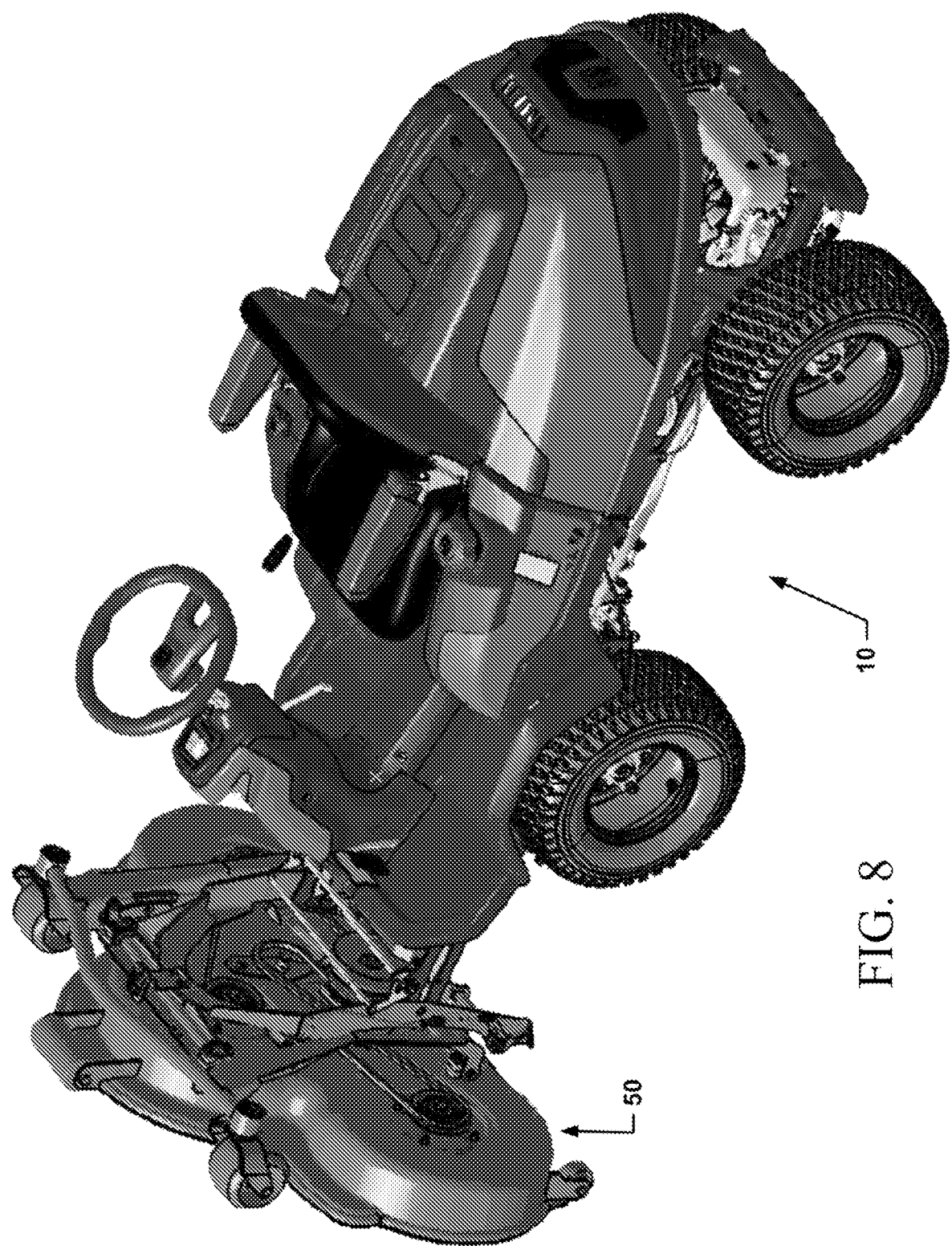
Figure 9:
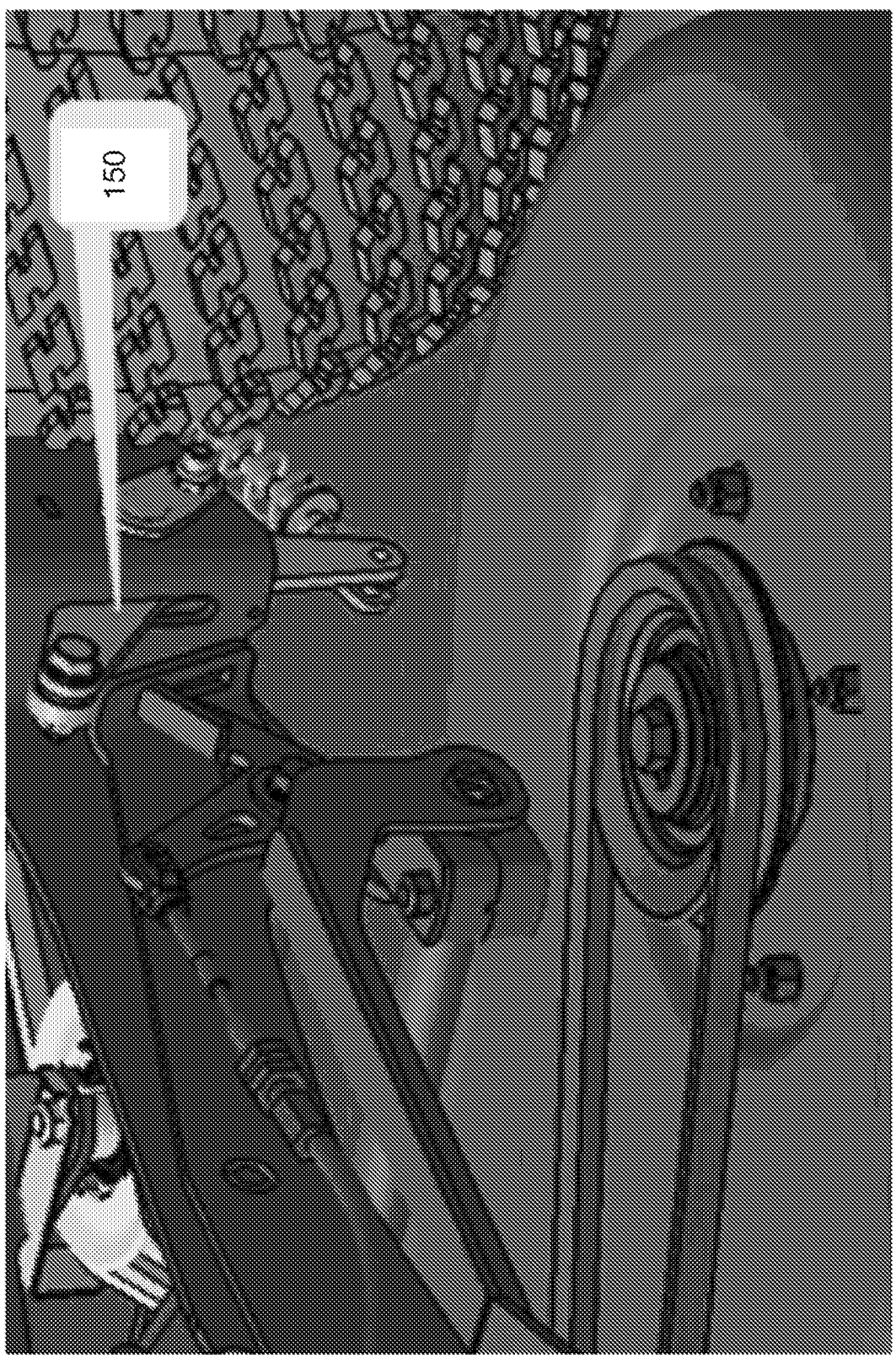

FIG. 3, which is defined by FIGS. 3A, 3B and 3C, illustrates a perspective view of the cutting deck of FIGS. 1 and 2 along with portions of the riding lawn care vehicle to illustrate structures associated with mating the cutting deck to an equipment frame of the riding lawn care vehicle according to an example embodiment;

FIG. 4 illustrates a cross section view of some pulley wheels of a belt positioning system according to an example embodiment;

FIG. 5 illustrates a perspective view of a service lock latch and an equipment lock latch in accordance with an example embodiment;

FIG. 6, which is defined by FIGS. 6A, 6B and 6C, illustrates the mating of the equipment frame with the cutting deck in accordance with an example embodiment;

FIG. 7, which is defined by FIGS. 7A, 7B, 7C, 7D, 7E and 7F, illustrates the transitioning of the cutting deck from the operational position to the service position in accordance with an example embodiment;

FIG. 8 is a perspective view of the riding lawn care vehicle with the cutting deck in the service position in accordance with an example embodiment; and FIG. 9 illustrates a perspective view of a height adjustment assembly according to an example embodiment.

DETAILED DESCRIPTION

Some example embodiments now will be described more fully hereinafter with reference to the accompanying drawings, in which some, but not all example embodiments are shown. Indeed, the examples described and pictured herein should not be construed as being limiting as to the scope, applicability or configuration of the present disclosure. Rather, these example embodiments are provided so that this disclosure will satisfy applicable legal requirements. Like reference numerals refer to like elements throughout. Furthermore, as used herein, the term "or" is to be interpreted as a logical operator that results in true whenever one or more of its operands are true. Additionally, the term "lawn care" is meant to relate to any yard maintenance activity and need not specifically apply to activities directly tied to grass, turf or sod care. As used herein, operable coupling should be understood to relate to direct or indirect connection that, in either case, enables functional interconnection of components that are operably coupled to each other. Although terms such as equipment, attachment, accessory and/or the like may each be used to generally interchangeably to describe components of various devices, some of these terms may be used to differentiate certain components of example embodiments for purposes of clarity.

Some example embodiments may improve operator comfort, ease of maintenance, operability, and overall device utility of lawn care vehicles such as, for example, riding lawn mowers with an equipment frame that is front mounted. In this regard, FIG. 1 illustrates a perspective view of a riding lawn care vehicle 10 that includes a front mounted equipment frame according to an example embodiment. FIGS. 2-9 illustrate various additional views of components or portions of the riding lawn care vehicle 10 according to an example embodiment. Although FIGS. 1-9 show a front mounted model, it is also possible for example embodiments to be practiced in connection with rear-mounted attachments, or attachments mounted (using the structures described herein) to any other portion of the riding lawn care vehicle 10.

FIG. 1 illustrates a riding lawn care vehicle 10 that may include a seat 20 that may be disposed at a center, rear or front portion of the riding lawn care vehicle 10. Terms such as front, forward, rear and rearward, should generally be understood to be considered relative to the normal driving direction of the riding lawn care vehicle 10 and direction the operator faces. The operator faces forward and toward the front of the riding lawn care vehicle 10 during normal operation in the normal driving direction. The riding lawn care vehicle 10 may also include a steering assembly 30 (e.g., a steering wheel, handle bars, joystick(s) or the like) operably coupled to rear wheels 32 of the riding lawn care vehicle 10 to allow the operator to steer the riding lawn care vehicle 10 via steering inputs that are communicated to the rear wheels 32. Since steering control is provided to the rear wheels 32, the front wheels 34 may not receive steering inputs in some embodiments. However, it may be possible to reverse the arrangement described above such that the front wheels 34 receive steering inputs and the rear wheels 32 do not in alternative embodiments. Regardless of the steering paradigm employed, the operator may sit on the seat 20, which may be disposed to the rear of the steering assembly 30 to provide input for steering of the riding lawn care vehicle 10 via the steering assembly 30. Additionally, although this example shows a mobility assembly including wheels, it is also possible for the mobility assembly to include tracks.

In an example embodiment, the steering assembly 30 may include a steering wheel 36 and a steering column 37. The steering column 37 may operably couple the wheels to which steering inputs are provided to communicate steering inputs inserted at the steering wheel 36 to (in this case) the rear wheels 32 via mechanical and/or electrical connections. The riding lawn care vehicle 10 may also include additional control related components that may be disposed at a control panel 40. The control related components may include levers, buttons, switches and/or the like configured to provide control over certain functions or components such as a blade speed adjuster, a choke control, a cutting height adjuster and/or a cutting unit controller. In some embodiments, one or more additional controllers, may be provided in the form of foot pedals that may sit proximate to a footrest 46 (which may include a portion on both sides of the riding lawn care vehicle 10 (e.g., on opposite sides of the steering column 37)) to enable the operator to rest his or her feet thereon while seated in the seat 20. These foot pedals may provide speed control for forward and/or rearward operation, braking, cutting deck lifting or other functions.

In some example embodiments, the steering assembly 30 may be embodied as an assembly of metallic or other rigid components that may be welded, fitted, bolted or otherwise operably coupled to each other and coupled to the wheels (rear wheels 32 in this example) of the riding lawn care vehicle 10 to which steering inputs are provided. For example, the steering assembly 30 may include or otherwise be coupled with a steering cable assembly or a system of mechanical linkages (e.g., pulleys, tie rods, cams, and/or other mechanical components) to translate rotational motion applied to the steering assembly 30 (and more particularly to the steering wheel 36) into directional inputs to orient the wheels accordingly. Other steering control systems may be employed in some alternative embodiments.

The riding lawn care vehicle 10 may also include, or be configured to support attachment of, a cutting deck 50 having at least one cutting blade mounted therein. The cutting deck 50 may be a removable attachment that may be positioned in front of the front wheels 34 in a position to enable the operator to cut grass using the cutting blade when the cutting blade is rotated below the cutting deck 50 and the cutting deck 50 is in a cutting position. When operating to cut grass, some example embodiments may provide that the grass clippings may be captured by a collection system, mulched, or expelled from the cutting deck 50 (e.g., via a discharge that may be directed to a side or rear of the cutting deck 50 and/or riding lawn care vehicle 10).

The cutting deck 50 may include an attachment frame 52 to which a housing 54 and caster wheels 56 (and/or other supporting wheels) are attached. The cutting deck 50 may also include a cover (not shown) that may cover some portions of the attachment frame 52 and/or the housing 54 to protect such components or to improve the aesthetic appearance of the cutting deck 50. The attachment frame 52 may be connectable to an equipment frame 60 of the riding lawn care vehicle 10. The equipment frame 60 may be attached to a frame of the riding lawn care vehicle 10 at a front portion of the riding lawn care vehicle 10. In some cases, the equipment frame 60 may extend forward from a portion of the riding lawn care vehicle 10 that is between the front wheels 34. The attachment frame 52 may therefore be alternately connected to and disengaged from the equipment frame 60 to create two distinct states for the riding lawn care vehicle 10, namely a connected state and a disconnected state. Meanwhile, as will be discussed in greater detail below, the connected state may have two further states or positions including an operational position and a service position.

In some embodiments, the cutting deck 50 may be replaced by other working attachments to change the configuration of the riding lawn care vehicle 10 and correspondingly change the tasks that may be performed by the riding lawn care vehicle 10. Thus, for example, a plow blade or snow blower attachment may be provided to convert the riding lawn care vehicle 10 into a snow removal device. Alternatively, a tiller attachment may be provided to convert the riding lawn care vehicle 10 into a ride-on or remote control operable tiller. Other attachments and configurations are also possible such as, for example, brush cutter attachments, utility bucket attachments, flail mower attachments, snow thrower attachments, broom attachments, blower attachments, folding plough attachments, and/or the like. These attachments may, in some cases, be or further include working assemblies (e.g., a cutting deck may include a blade as a working assembly). In each case, the attachment frame 52 may be disengaged from the equipment frame 60 to place the riding lawn care vehicle 10 in the disconnected state. Thereafter, one of the other attachments may be attached to the equipment frame 60 to place the riding lawn care vehicle 10 in a connected state relative to the one of the other attachments.

In the pictured example embodiment of FIG. 1, an engine of the riding lawn care vehicle 10 is disposed in an engine compartment 70 that is behind a seated operator in a rear portion of the riding lawn care vehicle 10. However, in other example embodiments, the engine could be in different positions such as in front of or below the operator, and the operator may be standing at a stand-on operator location. In some embodiments, the engine may be operably coupled to one or more of the wheels of the riding lawn care vehicle 10 in order to provide drive power for the riding lawn care vehicle 10. In some embodiments, the engine may be capable of powering two wheels, while in others, the engine may power all four wheels of the riding lawn care vehicle 10. Moreover, in some cases, the engine may manually or automatically shift between powering either some wheels or all four wheels of the riding lawn care vehicle 10. The engine may be a petrol engine, or may be replaced by an electric motor in some cases.

The engine, the steering assembly 30, the cutting deck 50, the seat 20 and other components of the riding lawn care vehicle 10 may be operably coupled to the frame of the riding lawn care vehicle 10. The frame may be a rigid structure configured to provide support, connectivity and interoperability functions for various ones of the components of the riding lawn care vehicle 10. In some embodiments, the frame may be split or articulated such that, for example, the front wheels 34 are disposed on an opposite portion of the frame than the portion of the frame on which the rear wheels 32 are disposed with respect to an articulated joint in the frame. In some embodiments, the articulated joint may form a linkage arrangement that may, in some cases, be referred to as a "dog-bone" articulated arrangement.

Referring now to FIG. 2, in which the riding lawn care vehicle 10 is shown in the disconnected state, various components of the cutting deck 50 and equipment frame 60 will be discussed. As shown in FIG. 2, the equipment frame 60 may include a latching assembly 100 configured to enable operably coupling the attachment frame 52 to the equipment frame 60 in either the service position or the operational position. Thus, in some cases, the latching assembly 100 may include separate latches or structural assemblies for each respective position. However, the latching assembly 100 could alternatively include one structural assembly that accomplishes both tasks. In the example of FIG. 2, the latching assembly 100 includes a service lock latch 110 configured to operably couple the attachment frame 52 to the equipment frame 60 in the service position (e.g., for cleaning or maintenance on components of the cutting deck 50), and includes an equipment lock latch 120 configured to operably couple the attachment frame 52 to the equipment frame 60 in the operational position (e.g., for cutting grass via the blades inside the cutting deck 50).

The latching assembly 100 may be operably coupled to guide rails 130 that form a portion of the equipment frame 60. The guide rails 130 may be operably coupled to the frame of the riding lawn care vehicle 10 forward of and between the front wheels 34. The guide rails 130 may, in some cases, extend substantially parallel to each other and substantially parallel to a longitudinal centerline of the riding lawn care vehicle 10. In some cases, the guide rails 130 may also extend substantially parallel to the ground surface. The guide rails 130 may be formed from sheet metal or metallic bars and may, in some cases, be operably coupled to each other via cross members. The cross members may provide structural support to the guide rails 130 and, in some cases, may provide positioning services relative to belt guiding or alignment as discussed in greater detail below.

In an example embodiment, each of the guide rails 130 may include a respective instance of a guide slot 132 and a positional adjustment slot 134. The guide slot 132 may be located rearward of the positional adjustment slot 134 along the length of the guide rails 130. In some cases, the guide slot 132 may have a generally V shape with a wider open end and a relatively narrow apex. The V shape may be opened or oriented in the forward direction, and may be disposed on a bottom side of the guide rail 130 to open generally forward and slightly downward. The positional adjustment slot 134 may be disposed from a distal end of the guide rail 130 and extend along a longitudinal length of the guide rail 130 toward a longitudinal center of the guide rail 130. Both the service lock latch 110 and the equipment lock latch 120 may be disposed proximate to the positional adjustment slot 134.

The service lock latch 110 may include a first pivot member 112 and a second pivot member 114 along with a cross member 116 that extends between the first and second pivot members 112 and 114. In an example embodiment, the first and second pivot members 112 and 114 may be operably coupled to a top portion of respective opposing ones of the guide rails 130 at a pivot joint. In some cases, the first and second pivot members 112 and 114 may be operably coupled to the respective opposing ones of the guide rails 130 such that the first and second pivot members 112 and 114 are disposed outside of the guide rails 130. Thus, the pivot joint may allow the cross member 116 to alternately rest on top of the guide rails 130 or be pivoted away from the guide rails for transitioning to the service position as described in greater detail below.

The equipment lock latch 120 may include a first pivot arm 122 and a second pivot arm 124 along with a cross bar 126 that extends between the first and second pivot arms 122 and 124. In an example embodiment, the first and second pivot arms 122 and 124 may be operably coupled to a generally central portion of respective opposing ones of the guide rails 130 at a pivot joint. In some cases, the first and second pivot arms 122 and 124 may be operably coupled to the respective opposing ones of the guide rails 130 such that the first and second pivot arms 122 and 124 are disposed inside of the guide rails 130. Thus, the pivot joints of the first and second pivot arms 122 and 124 may allow the cross bar 126 to alternately be raised and lowered between the guide rails 130 to allow the cutting deck 50 to be joined to the equipment frame 60, removed therefrom, or be pivoted to the service position as described in greater detail below.

The attachment frame 52 may include a first rail 140 and a second rail 142 that are substantially parallel to each other, and spaced apart from each other by a distance. In some embodiments, that distance is either slightly more than or less than the distance that separates the guide rails 130. In the example of FIG. 2, the distance between the first and second rails 140 and 142 is slightly larger than the distance between the guide rails 130 so that, when aligned, the first and second rails 140 and 142 are configured to mate with outside edges of the guide rails 130. The inside facing sides of the first and second rails 140 and 142 may each include connection studs (e.g., a first set of connection studs 144 and a second set of connection studs 146) that face each other. When the guide rails 130 are aligned with the first and second rails 140 and 142 for mating of the equipment frame 60 and the attachment frame 52, the first set of connection studs 144 may ride into the guide slots 132 on the guide rails 130, while the second set of connection studs 146 ride into the positional adjustment slots 134 on the guide rails 130. Accordingly, the first set of connection studs 144 may be located at a lower elevation (relative to the ground) than the second set of connection studs 146 to allow the first set of connection studs 144 to pass underneath the distal ends of the guide rails 130 to reach the guide slots 132. The first connection studs 144 may rest in the guide slots 132 without any specific structure being employed to retain the first connection studs 144 in the guide slots 132. However, the second connection studs 146 may be retained in the positional adjustment slots 134 by the first and second pivot arms 122 and 124 in certain situations (as described in greater detail below).

The attachment frame 52 of the cutting deck 50 may be operably coupled to a housing frame 145 in such a way that allows cutting height adjustments to be made by altering the height of the cutting deck 50. For example, the attachment frame 52 may be rigidly mountable to the equipment frame 60 and the housing frame 145 may be rigidly mounted to the housing 54, but the housing frame 145 may be adjustably mounted relative to the attachment frame 52 based on operation of a height adjustment assembly 150. The height adjustment assembly 150 may be adjusted to alter a pivot point or multiple pivot points at which the housing frame 145 is operably coupled to the attachment frame 52. By changing the orientation of the housing frame 145 relative to the fixed height of the attachment frame 52, the relative height of the castor wheels 56 (which are carried on the housing frame 145) may be adjusted to correspondingly adjust cutting height. In an example embodiment, the height adjustment assembly 150 may be operated remotely by operation of a lever or other control operator disposed, for example, at the control panel 40. The lever may be operably coupled to the height adjustment assembly 150 via a Bowden cable or other flexible member via which forces may be transmitted.

The cutting deck 50 houses one or multiple blades in the housing 54, as mentioned above. The blade or blades are driven by a blade drive system 180 that includes a main blade drive pulley 182 (e.g., a double pulley having two wheels mounted to one shaft) and one or more other drive pulleys 184 that are operably coupled to the main blade drive pulley 182 by a blade drive belt 190. The blade drive belt 190 may be powered via the blade drive pulley 182 when the blade drive system 180 receives power from the riding lawn care vehicle 10. The power may then be transferred to the other drive pulleys 184, each of which turns a corresponding blade.

Attachment of the attachment frame 52 of the cutting deck 50 to the equipment frame 60 will now be described in reference to FIG. 3, which is defined by FIGS. 3A, 3B and 3C. FIG. 3A illustrates the cutting deck 50 immediately prior to connection to the equipment frame 60, while FIG. 3B illustrates the process of installation for automatic belt connection upon docking or mating of the cutting deck 50 with the equipment frame 60. FIG. 3C illustrates a closeup view of a belt positioning system 200 according to an example embodiment. FIG. 4 illustrates a cross section view of some pulleys of the belt positioning system 200 in accordance with an example embodiment.

A typical process for connecting a cutting deck to a riding lawn mower involves mechanically connecting the cutting deck to a portion of the frame of the mower, and then subsequently further requires the serpentine belt (or other flexible driving member) of the mower to be connected to the blade drive system of the cutting deck. The connection of the serpentine belt is typically a separate step that requires tools to perform. Example embodiments may eliminate the need for usage of tools in connection with coupling the belt to the cutting deck, and also eliminate attachment of the belt as a separate step since the belt connection is automatically performed by docking the cutting deck 50 with the equipment frame 60.

Referring to FIGS. 3 and 4, the belt positioning system 200 includes an arrangement of pulleys and other components that position a belt for automatic connection when the cutting deck 50 is mated with the equipment frame 60. As shown in FIG. 3A, a main drive pulley 210 (e.g., a double pulley having two wheels mounted to one shaft) may be operably coupled to a main drive belt 212 and an equipment drive belt 214 to transfer power provided from the engine of the riding lawn care vehicle 10 to the cutting deck 50 via the equipment drive belt 214. In this regard, power from the engine turns the main drive belt 212 and consequently also the main drive pulley 210, which transfers that power to the equipment drive belt 214. The equipment drive belt 214 is positioned via one or more other pulleys to be routed forward and inside of tensioning wheels 220 before being routed toward a longitudinal centerline and rearward by a set of guide wheels 222. In an example embodiment, the guide wheels 222 may be disposed between the guide rails 130. However, the guide wheels 222 may be at a lower elevation than the guide rails 130.

In some cases, guide posts 223 (see FIG. 3C) or other guiding apparatuses may be disposed proximate to the guide wheels 222 to ensure that the equipment drive belt 214 is routed around the guide wheels 222 and rearward to form a slack portion (when the cutting deck 50 is not connected) of the equipment drive belt 214 that acts as substantially U shaped receiving portion 230. During mating of the equipment frame 60 with the cutting deck 50, the blade drive pulley 182 of the cutting deck 50 may fit into the receiving portion 230 and engage with the equipment drive belt 214 without any need for user interaction to connect the equipment drive belt 214.

The receiving portion 230 may maintain the substantially U shape even when the cutting deck 50 is not mated with the equipment frame 60 so that the receiving portion 230 is poised and ready to receive the blade drive pulley 182 as either the cutting deck 50 is moved rearward toward the equipment frame 60 or the equipment frame 60 is moved forward toward the cutting deck 50 to mate the equipment frame 60 to the attachment frame 52. In this regard, the equipment drive belt 214 may be partially supported by cross members of the equipment frame and/or the rigidity of the belt may prevent sagging of the equipment drive belt 214 at the portion of the equipment drive belt 214 that forms the receiving portion 230.

Accordingly, when relative motion (shown by arrow 240 in FIG. 3B) between the cutting deck 50 and the equipment frame 60 occurs while the first and second rails 140 and 142 are substantially aligned with the guide rails 130, the blade drive pulley 182 will relatively move rearward through the position of the blade drive pulley 182' shown in FIG. 3B and ultimately into the receiving portion 230 at a final position of the belt drive pulley 182" also shown in FIG. 3B.

As can be appreciated from FIGS. 3B and 3C, the blade drive pulley 182 may move into a position substantially between the guide wheels 222 when the blade drive pulley 182 first achieves engagement with the equipment drive belt 214. Thereafter, the blade drive pulley 182 may move rearward of both of the guide wheels 222 to ultimately achieve engagement with the receiving portion 230 of the equipment drive belt 214 when the cutting deck 50 is fully mated with the equipment frame 60.

In order to account for any sagging that may occur in the equipment drive belt 214 at the portion of the equipment drive belt 214 that forms the receiving portion 230, the blade drive pulley 182 may be designed to improve belt capturing performance. In this regard, for example, FIG. 4 illustrates a cross section view taken through the axes of the guide wheels 222 while the blade drive pulley 182 is in the position shown in FIG. 3C. As can be seen in FIG. 4, a width (W1) of the guide wheels 222 may be less than a width (W2) of the blade drive pulley 182. However, top surfaces of the guide wheels 222 and the blade drive pulley 182 may be substantially coplanar. Thus, since W2>W1, the blade drive pulley 182 has a lower bottom surface than both of the guide wheels 222. The channel 250 formed in the belt wheel of the blade drive pulley 182 that engages the equipment drive belt 214 is also substantially V shaped. Thus, the lower elevation of the bottom of the channel 250, coupled with the shape that narrows to the apex of the V shape will allow the equipment drive belt 214 to be captured even if there is some sagging in the equipment drive belt 214 at the receiving portion 230.

Operation of the service lock latch 110 and the equipment lock latch 120 will now be discussed in reference to FIGS. 5-8. In this regard, FIG. 5 illustrates a perspective view of the service lock latch 110 and the equipment lock latch 120 in accordance with an example embodiment. Referring first to FIG. 5, the service lock latch 110 pivots about a pivot axis 111, and the equipment lock latch 120 pivots about a second pivot axis 121. FIG. 6, which is defined by FIGS. 6A, 6B and 6C, illustrates the mating of the equipment frame 60 with the cutting deck 50 in accordance with an example embodiment. FIG. 7, which is defined by FIGS. 7A, 7B, 7C, 7D, 7E and 7F, illustrates the transitioning of the cutting deck 50 from the operational position to the service position in accordance with an example embodiment. FIG. 8 is a perspective view of the riding lawn care vehicle 10 with the cutting deck 50 in the service position in accordance with an example embodiment. In connection with the descriptions herein relating to interactions of components on one side of the service lock latch 110 or the equipment lock latch 120, it should be appreciated that the same or mirrored interactions occur on the other side substantially simultaneously.

Referring to FIGS. 5 and 6, the mating of the equipment frame 60 with the attachment frame 52 will be described according to an example embodiment. In this regard, FIG. 6 is a cross section view. Thus, the interaction shown is the interaction between the guide rail 130 on the right side of the riding lawn care vehicle 10 and the first rail 140. As shown in FIG. 6A, when initial contact is made between the connection stud 146 and the distal end of the first pivot arm 122, the guide rail 130 on the right side of the riding lawn care vehicle 10 and the first rail 140 are substantially aligned and the cutting deck 50 can be moved rearward in the direction of arrow 300. At this point, the connection stud 146 is substantially aligned with the positional adjustment slot 134, and the connection stud 144 is substantially aligned with the guide slot 132 due to the different respective elevations thereof. The cross bar 126 may be lifted in the direction of arrow 310 (e.g., by the operator or by a remote actuator operably coupled to the cross bar 126) to allow the connection stud 146 to pass under the first pivot arm 122.

Transitioning to FIG. 6B, the first pivot arm 122 may slide along the connection stud 146 thereby lifting the first pivot arm 122 against the biasing force exerted by a biasing element 320 (e.g., a spring) operably coupled between the first pivot arm 122 and a portion of the equipment frame 60. The connection stud 146 is, by this point, within the positional adjustment slot 134, but not yet fully seated therein. The connection stud 144 is also just beginning to enter into the guide slot 132 as rearward motion in the direction of arrow 300 continues.

Finally, as shown in FIG. 6C, when the connection stud 146 reaches the proximal end of the positional adjustment slot 134, the connection stud 144 is also fully seated at the apex of the guide slot 132. At this point, a connection hook 330 formed at a portion of the first pivot arm 122 passes over the connection stud 144 to retain the connection stud 144 at the apex (i.e., at the proximal end) of the positional adjustment slot 134. The connection hook 330 may be drawn into position retaining the connection stud 146 by the biasing element 320. However, in some embodiments, the biasing element 320 may be omitted and gravity and/or friction may retain the connection hook 330 in position to retain the connection stud 146.

To remove the cutting deck 50, the reverse operations are employed. Thus, for example, the cross bar 126 may be lifted (e.g., in the direction of arrow 310) until the connection hook 330 no longer retains the connection stud 146. The cutting deck 50 may then be withdrawn in the direction opposite the direction of arrow 300 until the connection stud 144 is withdrawn from the guide slot 132 and the connection stud 146 is withdrawn from the positional adjustment slot 134.

Referring now to FIG. 7, a transition from the operational position to the service position will be described. FIG. 7A shows the cutting deck 50 in the operational position as described above in reference to FIG. 6C. To transition to the service position, the cross bar 126 may be lifted in the direction shown by arrow 400. The connection hook 330 may be clear of the connection stud 146 as described above for removal of the cutting deck 50 as shown in FIG. 7B. The first pivot arm 122 could, at this time, be released to slide along a sliding surface of the first pivot arm 122 (the sliding surface being positioned forward of the connection hook 330) while the cutting deck 50 is withdrawn in the direction of arrow 410 as shown in FIG. 7C. At this point, the connection stud 144 is also withdrawn from the guide slot 132 while the connection stud 146 is positioned about half way between distal and proximal ends of the positional adjustment slot 134. From the position shown in FIG. 7C, the cutting deck 50 could simply be withdrawn by continuing to move the cutting deck 50 in the direction of arrow 410 until the connection stud 146 is clear of the distal end of the first pivot arm 122 (which may require continued lifting of the cross bar 126 until clearance is achieved). However, if the operator instead desires to shift to the service position, then the operator can simply allow the first pivot arm 122 to re-engage the connection stud 146 as shown in FIG. 7D. In this regard, the first pivot arm 122 may include a service hook 420 disposed proximate to a distal end thereof. The service hook 420 may engage the connection stud 146 at a point at which the connection stud 144 is already fully withdrawn from the guide slot 132, but the connection stud 146 remains inside the positional adjustment slot 134 (albeit proximate to the distal end of the positional adjustment slot 134). Thereafter, as shown in FIG. 7E, the operator may grasp a handle 430 that is operably coupled to the housing frame 145 or otherwise lift a front end of the cutting deck 50 to pivot the cutting deck 50 in the direction shown by arrow 435 onto rear wheels 440 of the cutting deck 50. The cross member 116 of the service lock latch 110 may slide along a top surface of the first rail 142 in the direction shown by arrow 450. Finally, when the cross member 116 reaches a service slot 460 disposed on the top surface of the first rail 142, the cross member 116 may become seated and be retained in the service slot 460 as shown in FIG. 7F. At this point, the cutting deck 50 is in the service position, and can be retained in such position while maintenance or cleaning is conducted on portions of the cutting deck 50. The service position is shown in FIG. 8.

To return from the service position to the operational position, the cross member 116 may be lifted out of the service slot 460 to allow the cutting deck 50 to pivot back through the position shown in FIG. 7E to the position shown in FIG. 7D. When the cross member 116 is lifted in the direction of arrow 462, a catch member 464 disposed on the first pivot member 112 may engage the cross bar 126 of the equipment lock latch 120 to simultaneously reposition the equipment lock latch 120 when the service lock latch 110 is repositioned to unlock the service lock latch 110 from the service position. The lifting of the cross bar 126 allows the connection stud 146 to disengage from the service hook 420. The cutting deck 50 may then be slid toward the riding lawn care vehicle 10 in the manner described above in reference to FIGS. 6B and 6C. However, if the user preferred instead to remove the cutting deck 50, the operator could withdraw the cutting deck 50 from engagement with the equipment frame 60 entirely in the manner described above.

The latching assembly 100 of an example embodiment may therefore enable the cutting deck 50 to be locked in engagement with the equipment frame 60 of the riding lawn care vehicle in an operational position, or be withdrawn entirely or shifted to a service position. The latching assembly 100 further cooperates with the belt positioning system 200 to allow an equipment drive belt to be automatically connected for operation (without operator handling or positioning of the equipment drive belt) when the cutting deck 50 is engaged with the equipment frame 60. The connection and disconnection of the cutting deck 50 can therefore be accomplished relatively easily, while also allowing a transition to a service position, again via operation of the latching assembly 100.

When the cutting deck 50 is in the operational position, the cutting height can be adjusted via operation of the height adjustment assembly 150, which is shown in FIG. 9. The height adjustment assembly 150 includes portions on the cutting deck 50 and on the equipment frame 60, but such portions are operably coupled to each other seamlessly upon mating of the cutting deck 50 with the equipment frame 60. Thus, again, the operator need not employ tools or physically interact with any portion of the height adjustment assembly 150 in order to make connections between the portions of the height adjustment assembly 150 that are on the cutting deck 50 and those that are on the equipment frame 60. Instead, by placing the cutting deck 50 into the operational position, the corresponding portions of the height adjustment assembly 150 are brought into proximity of one another and are positioned for interaction with each other without further action by the operator. Actual adjustments to cutting height may be made by the operator using a lever disposed at the control panel 40. However, the making of such adjustments can be accomplished without the operator having to interact physically with the components of the height adjustment assembly 150 itself.

It should be appreciated that example embodiments of the present invention provide a new type of configuration for a front mounted riding lawn care vehicle. Example embodiments may provide a riding lawn care vehicle that includes a frame to which front wheels and rear wheels are operably coupled, an equipment frame operably coupled to the frame forward of the front wheels, a steering assembly operably coupled to at least one of the front wheels or rear wheels to enable an operator seated on the riding lawn care vehicle to provide steering control of the riding lawn care vehicle, a removable cutting deck and a belt positioning system. The cutting deck includes a rotatable blade and is configured to receive power for turning the blade from an equipment drive belt of the vehicle when the equipment drive belt is operably coupled with the cutting deck. The belt positioning system is configured to enable the equipment drive belt to be automatically operably coupled between the cutting deck and the riding lawn care vehicle in response to the cutting deck being docked with the equipment frame in an operational position. Thus, for example, the riding lawn care vehicle may include a vehicle frame, an engine supported at least in part by the vehicle frame, a mobility assembly operably coupled to the vehicle frame, an equipment frame operably coupled to the vehicle frame to extend forward of the mobility assembly, a steering assembly operably coupled to the mobility assembly to enable an operator positioned on the riding lawn care vehicle to provide steering control of the riding lawn care vehicle, a belt positioning system operably coupled to the vehicle frame and comprising an equipment drive belt, and a removable cutting deck including a cutting blade and configured to automatically switch from a disconnected state to a connected state in response to docking the cutting deck with the equipment frame. In the connected state, the cutting deck is operably coupled to the equipment frame such that the equipment drive belt is configured to transfer power from the engine to the cutting deck to drive the cutting blade. In the disconnected state, the equipment drive belt is not configured to transfer power from the engine to the cutting deck to drive the cutting blade. The vehicles structure and configuration may provide improved accessibility, versatility, cutting performance and/or the like for the riding lawn care vehicle.

In some cases, the vehicle may include additional optional features, structures or components, or the components described above may be augmented, modified or improved. For example, in some cases, the vehicle may further include a latching assembly configured to be operable to alternately enable engagement between the equipment frame and the cutting deck in an operational position or a service position, and enable disengagement of the cutting deck from the equipment frame. In some cases, the latching assembly may be remotely operable while the operator is seated to enable the belt positioning system to provide automatic operable coupling of the equipment drive belt while the operator remains seated and without operator handling or positioning of the equipment drive belt. Alternatively or additionally, the latching assembly may be manually operable by the operator to enable the belt positioning system to provide automatic operable coupling of the equipment drive belt without operator handling or positioning of the equipment drive belt. In an example embodiment, the belt positioning system may include at least two guide wheels disposed between guide rails of the equipment frame forward of the front wheels. The at least two guide wheels may guide the equipment drive belt in a rearward direction to form a receiving portion in the equipment drive belt. The receiving portion may be disposed substantially between the at least two guide wheels. A blade drive pulley of the cutting deck may engage the receiving portion responsive to engagement of the cutting deck with the equipment frame to operably couple the equipment drive belt between the cutting deck and the riding lawn care vehicle. In some cases, a width of a wheel of the blade drive pulley may be larger than a width of the at least two guide wheels and tops of the at least two guide wheels and the wheel of the blade drive pulley are substantially coplanar. In an example embodiment, the wheel of the blade drive pulley may have a substantially V shaped channel. In some example embodiments, the latching assembly may include an equipment lock latch operably coupled to guide rails of the equipment frame. The cutting deck may include an attachment frame operably coupled to a housing of the cutting deck. The attachment frame may include a first rail and a second rail that extend substantially parallel to each other to engage respective ones of the guide rails. The equipment lock latch may be biased to a first position and pivotable away from the first position toward a second position. The equipment lock latch may retain the equipment frame relative to the attachment frame in the first position when the cutting deck is docked with the equipment frame. In an example embodiment, responsive to pivoting the equipment lock latch to the second position, the cutting deck may be removable from engagement with the equipment frame. In some cases, the latching assembly may include a service lock latch operably coupled to guide rails of the equipment frame. Responsive to pivoting the equipment lock latch to the second position, the cutting deck may be repositionable to a service position in which the cutting deck is pivoted to be substantially perpendicular to the direction of extension of the guide rails. In some cases, the service lock latch may engage a service slot in the first rail and the second rail to lock in the service position. In an example embodiment, the service lock latch may include a catch member configured to simultaneously reposition the equipment lock latch when the service lock latch is repositioned to unlock the service lock latch from the service position.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe exemplary embodiments in the context of certain exemplary combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. In cases where advantages, benefits or solutions to problems are described herein, it should be appreciated that such advantages, benefits and/or solutions may be applicable to some example embodiments, but not necessarily all example embodiments. Thus, any advantages, benefits or solutions described herein should not be thought of as being critical, required or essential to all embodiments or to that which is claimed herein. Although specific terms are employed herein, they are used in a generic and descriptive sense only and not for purposes of limitation.

That which is claimed:
1. A vehicle comprising:
a vehicle frame;
an engine supported at least in part by the vehicle frame;
a mobility assembly operably coupled to the vehicle frame;
an equipment frame operably coupled to the vehicle frame;
a belt positioning system operably coupled to the vehicle frame and comprising an equipment drive belt; and
a removable attachment comprising a working assembly and configured to automatically switch from a disconnected state to a connected state in response to docking the attachment with the equipment frame,
wherein, in the connected state, the attachment is operably coupled to the equipment frame such that the equipment drive belt is configured to transfer power from the engine to the attachment to drive the working assembly,
wherein, in the disconnected state, the equipment drive belt is not configured to transfer power from the engine to the attachment to drive the working assembly,
wherein the vehicle comprises a riding lawn care vehicle, wherein the working assembly comprises a cutting blade housed in the removable attachment, wherein the removable attachment comprises a cutting deck, wherein the belt positioning system comprises at least two guide wheels disposed between guide rails of the equipment frame forward of the mobility assembly, the at least two guide wheels guiding the equipment drive belt in a rearward direction to form a receiving portion in the equipment drive belt, the receiving portion being disposed substantially between the at least two guide wheels,
wherein a blade drive pulley of the cutting deck engages the receiving portion responsive to engagement of the cutting deck with the equipment frame to operably couple the equipment drive belt between the cutting deck and the riding lawn care vehicle, and
wherein a width of a wheel of the blade drive pulley is larger than a width of the at least two guide wheels and tops of the at least two guide wheels and the top of the wheel of the blade drive pulley are substantially coplanar, and wherein the wheel of the blade drive pulley has a substantially V shaped channel.

2. The vehicle of claim 1, wherein the vehicle comprises a riding lawn care vehicle, wherein the working assembly comprises a cutting blade housed in a removable attachment, wherein the removable attachment comprises a cutting deck, and wherein the riding lawn care vehicle further comprises a latching assembly configured to be operable to alternately enable engagement between the equipment frame and the cutting deck in an operational position or a service position, and enable disengagement of the cutting deck from the equipment frame.

3. The vehicle of claim 2, wherein the latching assembly is remotely operable while the operator is seated to enable the belt positioning system to provide automatic operable coupling of the equipment drive belt while the operator remains seated and without operator handling or positioning of the equipment drive belt.

4. The vehicle of claim 2, wherein the latching assembly is manually operable by the operator to enable the belt positioning system to provide automatic operable coupling of the equipment drive belt without operator handling or positioning of the equipment drive belt.

5. The vehicle of claim 2, wherein the latching assembly comprises an equipment lock latch operably coupled to guide rails of the equipment frame,
wherein the cutting deck comprises an attachment frame operably coupled to a housing of the cutting deck, the attachment frame comprising a first rail and a second rail that extend substantially parallel to each other to engage respective ones of the guide rails,
wherein the equipment lock latch is biased to a first position and pivotable away from the first position toward a second position, and
wherein the equipment lock latch retains the equipment frame relative to the attachment frame in the first position when the cutting deck is docked with the equipment frame.

6. The vehicle of claim 5, wherein responsive to pivoting the equipment lock latch to the second position, the cutting deck is removable from engagement with the equipment frame.

7. The vehicle of claim 5, wherein the latching assembly comprises a service lock latch operably coupled to guide rails of the equipment frame, and
wherein responsive to pivoting the equipment lock latch to the second position, the cutting deck is repositionable to a service position in which the cutting deck is pivoted to be substantially perpendicular to the direction of extension of the guide rails,
wherein the service lock latch engages a service slot in the first rail and the second rail to lock in the service position, and
wherein the service lock latch comprises a catch member configured to simultaneously reposition the equipment lock latch when the service lock latch is repositioned to unlock the service lock latch from the service position.

8. A belt positioning system for a riding lawn care vehicle comprising a removable cutting deck, the belt positioning system comprising:
an equipment drive belt configured to transfer power from the riding lawn care vehicle to the cutting deck to turn at least one blade of the cutting deck; and
a plurality of pulleys disposed on the riding lawn care vehicle proximate to an equipment frame operably coupled to a front portion of a vehicle frame of the riding lawn care vehicle, the plurality of pulleys being configured to position the equipment drive belt relative to a blade drive pulley of the cutting deck,
wherein the belt positioning system is configured to enable the equipment drive belt to be automatically operably coupled to the blade drive pulley in response to the cutting deck being docked with the equipment frame in an operational position,
wherein the plurality of pulleys further comprise at least two guide wheels disposed between guide rails of the equipment frame forward of front wheels of the riding lawn care vehicle, the at least two guide wheels guiding the equipment drive belt in a rearward direction to form a receiving portion in the equipment drive belt, the receiving portion being disposed substantially between the at least two guide wheels,
wherein the blade drive pulley of the cutting deck engages the receiving portion responsive to engagement of the cutting deck with the equipment frame to operably couple the equipment drive belt between the cutting deck and the riding lawn care vehicle, and
wherein a width of a wheel of the blade drive pulley is larger than a width of the at least two guide wheels and tops of the at least two guide wheels and the top of the wheel of the blade drive pulley are substantially coplanar.

9. The belt positioning system of claim 8, wherein the wheel of the blade drive pulley has a substantially V shaped channel.

10. A riding lawn care vehicle comprising:
a vehicle frame to which a mobility assembly is operably coupled;
an equipment frame operably coupled to the vehicle frame forward of the mobility assembly;
a steering assembly operably coupled to the mobility assembly to enable an operator seated on the riding lawn care vehicle to provide steering control of the riding lawn care vehicle;

a removable cutting deck comprising at least one rotatable blade, the cutting deck being configured to receive power for turning the at least one rotatable blade from an equipment drive belt of the riding lawn care vehicle when the equipment drive belt is operably coupled with the cutting deck;

a latching assembly configured to be operable to alternately enable engagement between the equipment frame and the cutting deck in an operational position or a service position, and enable disengagement of the cutting deck from the equipment frame; and a belt positioning system operably coupled to the vehicle frame, wherein the belt positioning system comprises at least two guide wheels disposed between guide rails of the equipment frame, wherein the at least two guide wheels guide the equipment drive belt in a rearward direction to form a receiving portion in the equipment drive belt, the receiving portion being disposed substantially between the at least two guide wheels, wherein a blade drive pulley of the removable cutting deck engages the receiving portion responsive to engagement of the cutting deck with the equipment frame to operably couple the equipment drive belt between the cutting deck and the riding lawn care vehicle, and wherein a width of a wheel of the blade drive pulley is larger than a width of the at least two guide wheels and tops of the at least two guide wheels and the top of the wheel of the blade drive pulley are substantially coplanar.

11. The riding lawn care vehicle of claim 10, wherein the belt positioning system is configured to enable the equipment drive belt to be automatically operably coupled between the cutting deck and the riding lawn care vehicle in response to the cutting deck being docked with the equipment frame in the operational position.

12. The riding lawn care vehicle of claim 10, wherein the latching assembly comprises an equipment lock latch operably coupled to guide rails of the equipment frame, wherein the cutting deck comprises an attachment frame operably coupled to a housing of the cutting deck, the attachment frame comprising a first rail and a second rail that extend substantially parallel to each other to engage respective ones of the guide rails, wherein the equipment lock latch is biased to a first position and pivotable away from the first position toward a second position, and wherein the equipment lock latch retains the equipment frame relative to the attachment frame in the first position when the cutting deck is docked with the equipment frame.

13. The riding lawn care vehicle of claim 12, wherein responsive to pivoting the equipment lock latch to the second position, the cutting deck is removable from engagement with the equipment frame.

14. The riding lawn care vehicle of claim 12, wherein the latching assembly comprises a service lock latch operably coupled to guide rails of the equipment frame, and wherein responsive to pivoting the equipment lock latch to the second position, the cutting deck is repositionable to a service position in which the cutting deck is pivoted to be substantially perpendicular to the direction of extension of the guide rails.

15. The riding lawn care vehicle of claim 14, wherein the service lock latch engages a service slot in the first rail and the second rail to lock in the service position.

16. The riding lawn care vehicle of claim 15, wherein the service lock latch comprises a catch member configured to simultaneously reposition the equipment lock latch when the service lock latch is repositioned to unlock the service lock latch from the service position.

* * * * *